Oct. 1, 1957 — L. J. LHOTAK ET AL — 2,807,872
LEVER MECHANISM
Filed March 25, 1955
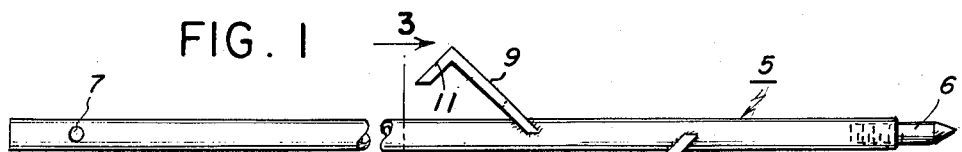
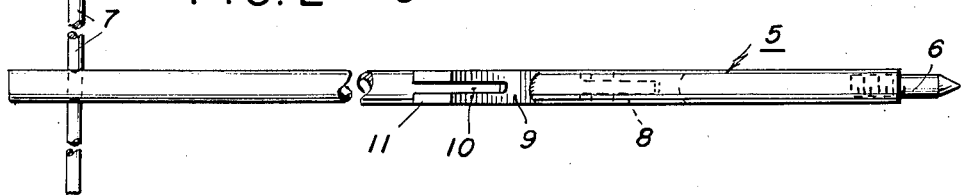
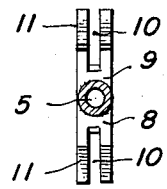
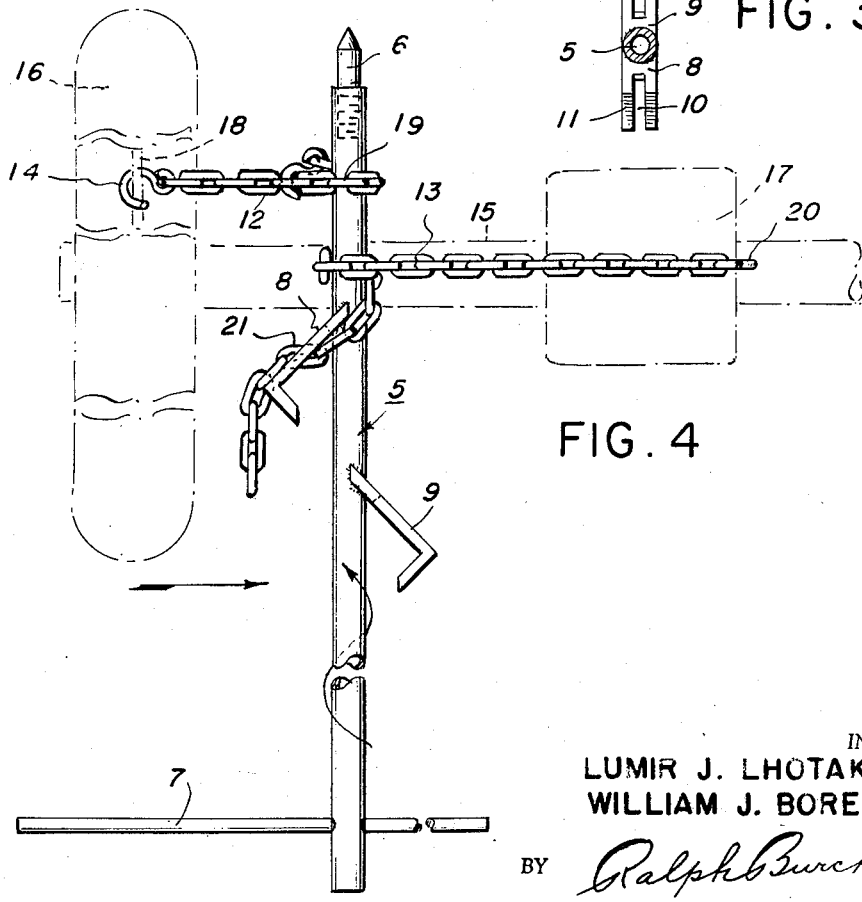
INVENTORS
LUMIR J. LHOTAK &
WILLIAM J. BORER
BY Ralph B Burch
ATTORNEY

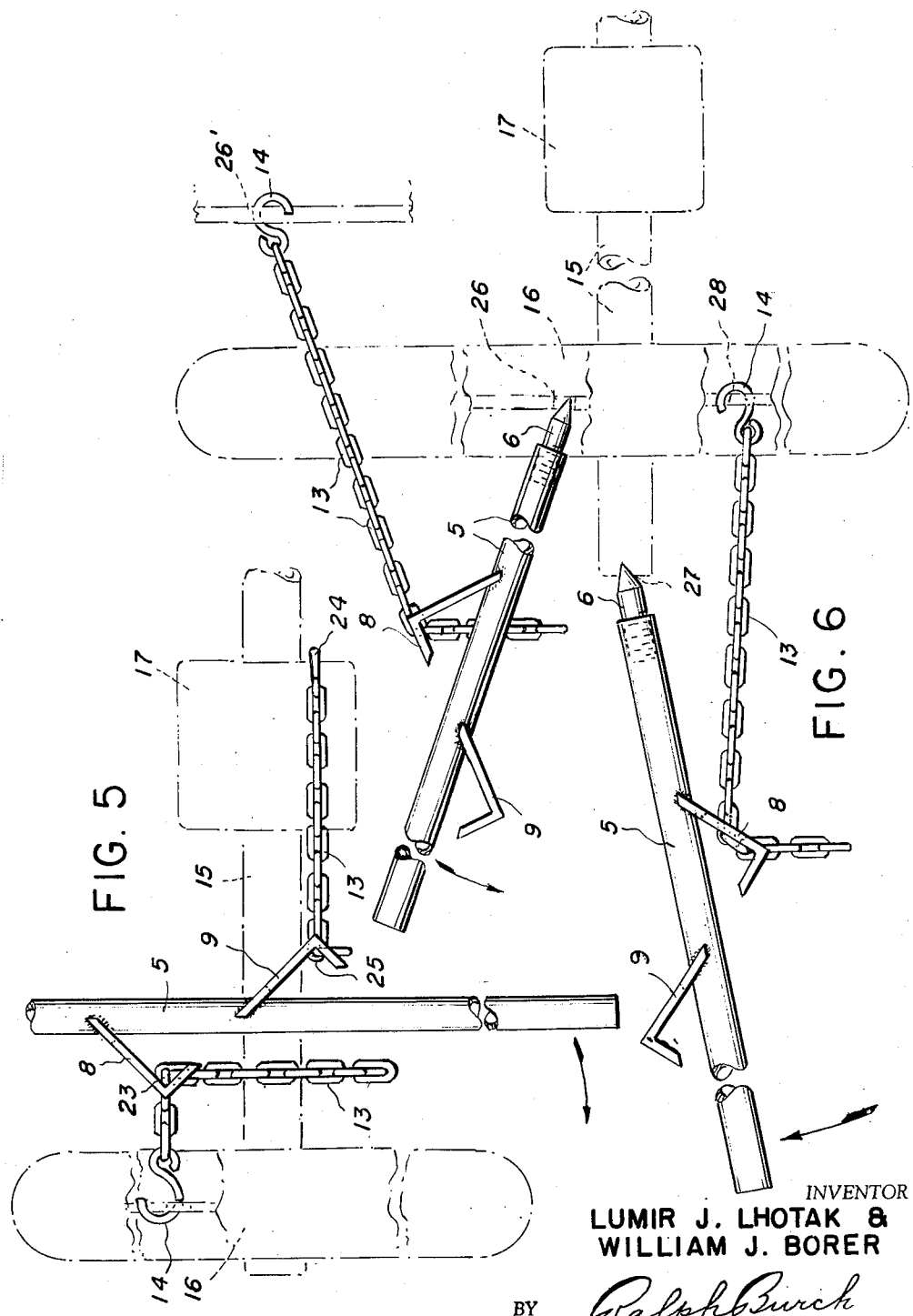

United States Patent Office 2,807,872
Patented Oct. 1, 1957

2,807,872

LEVER MECHANISM

Lumir J. Lhotak and William J. Borer, Tekamah, Nebr.

Application March 25, 1955, Serial No. 496,839

1 Claim. (Cl. 29—267)

This invention relates to a lever mechanism especially designed for moving the wheel of a tractor longitudinally on its shaft to facilitate the removal or applying of the wheel to its shaft.

It is an object of the invention to provide a lever having a fulcrum point at one end and a pair of chain attaching cleats arranged on opposite sides of the lever in different spaced relations to the fulcrum point.

A further object of the invention resides in providing a lever having chain attaching cleats arranged so a chain or chains when attached to the wheel of a tractor or a part of the tractor frame or both will upon movement of the lever on its fulcrum apply a force to move the wheel.

Another object of the invention resides in providing a tool of the above-mentioned character which is simple in construction, efficient in operation and inexpensive to manufacture.

Other objects and advantages of the invention will be apparent during the course of the following specification.

In the accompanying drawings forming a part of this specification and in which like numerals are employed to designate like parts throughout the same.

Fig. 1 is a side elevational view of the tool,

Fig. 2 is top view of the same,

Fig. 3 is a section taken on line 3—3 of Fig. 1,

Fig. 4 is a plan view showing one method of using the tool,

Fig. 5 is a plan view showing another method of using the tool, and,

Fig. 6 is a view showing still another method of using the tool.

Referring to the drawings wherein for the purpose of illustration a preferred example of the tool is shown, the numeral 5 denotes an elongated bar, preferably circular in cross section, having a socket at one end adapted to receive a removable fulcrum point 6 of hardened metal. The opposite end of the bar 5 is provided with a transverse aperture adapted to receive a removable cross rod 7 which serves as a handle to rotate the bar. A pair of cleats 8 and 9 are formed integral with the bar, intermediate its length, being disposed on opposite sides of the bar in different spaced relations from the point 6. The cleats are rectangular in cross section and extend outwardly at an angle to the longitudinal axis of the bar in a rearwardly inclined direction. The cleats are bifurcated throughout their length to provide slots 10 and the free ends 11 of the cleats are bent at right angles inwardly towards the bar. The slots 10 of the cleats 8 and 9 are adapted to receive the links 12 of a chain 13 which are arranged at right angles to each other and one end of the chain is provided with a hook 14 or other suitable attaching device.

The various methods of employing the tool are shown in Figs. 4, 5 and 6. In the method shown in Fig. 4 the bar 5 of the tool is disposed in cross relation to the shaft 15 on which the tractor wheel 16 is mounted intermediate the wheel and gear box 17. A chain 13 has one end engaged around a spoke of the tractor wheel, as at 18, and its opposite end loosely engaged around the bar, as at 19. A second chain has its hook end engaged with a side of the gear box 17, as at 20 and its opposite end wrapped around the bar 5 with one of the links engaged in the slot of the cleat 8, as at 21. Upon applying force to the rod 7 to rotate the bar in a counter clockwise direction the second chain will be wound on the bar thus applying a pulling force on the tractor wheel to move the wheel along the shaft in the direction of the gear box.

In the method shown in Fig. 5, the bar 5 is disposed in cross relation to the shaft 15 with one chain having one end attached to the wheel 16, as at 22, and its opposite end connected with the cleat 8, as at 23. The second chain has one end connected to the gear box 17, as at 24 and its opposite end connected to the cleat 9, as at 25. Upon applying force to move the bar 5 in the direction of the arrow, a pulling force is exerted on the first chain moving the wheel inwardly on the shaft.

In Fig. 6 the method of using the bar with a single chain for moving the wheel either inwardly or outwardly on the shaft is shown. To move the wheel inwardly along the shaft, the fulcrum point 6 of bar 5 is engaged in an opening in the side of the wheel, as at 26, and the chain 13 is passed between the spokes of the wheel with its hook 14 attached to a part of the tractor frame, as at 26'. A link of the chain at its opposite end is engaged in the slot of cleat 8 so the bar is disposed in a slightly upwardly inclined plane. Upon applying a downward pressure to the outer end of the bar the wheel is moved inwardly along the shaft. To move the wheel outwardly, the fulcrum point 6 of the bar 5 is engaged in a recess in the end of shaft 15, as at 27, with the cleat 8 positioned in a downwardly extending direction. One end of the chain is attached to the wheel, as at 28, and the other end has a link engaged in the slot of cleat 8 so the bar is disposed in a slightly downwardly inclined plane. Upon applying an upward pressure on the outer end of the bar the wheel is pulled outwardly along the shaft.

It is to be understood the form of my invention herein shown and described is a preferred example of the same and that changes in the shape, size and arrangement of the parts may be made without departing from the spirit of the invention or scope of the claim.

Having thus described our invention, we claim:

A tool for removing and replacing vehicle wheels comprising a bar, a fulcrum point extending axially from one end of said bar for removable engagement with a bearing surface to permit rocking movement of the bar, a pair of cleats formed integral with said bar at spaced apart intervals along the bar, said cleats extending from opposite sides of said bar at acute angles to the axis of the bar in the direction from the fulcrum point and having open ended slots with their free ends bent at right angles in the direction of the bar, and a pair of flexible elements, each element having one end engaged in the slot of a cleat and having attaching means at its opposite end.

References Cited in the file of this patent

UNITED STATES PATENTS

| | | |
|---|---|---|
| 299,506 | Banker | June 3, 1884 |
| 378,036 | Bjugstad | Feb. 14, 1888 |
| 1,034,874 | Clark | Aug. 6, 1912 |
| 1,261,164 | Quinlan | Apr. 2, 1918 |
| 1,317,145 | Skantz | Sept. 23, 1919 |
| 2,489,413 | Hink | Nov. 29, 1949 |